July 16, 1940.  F. L. McLAUGHLIN  2,208,008
SNAP FASTENER
Filed Jan. 10, 1938
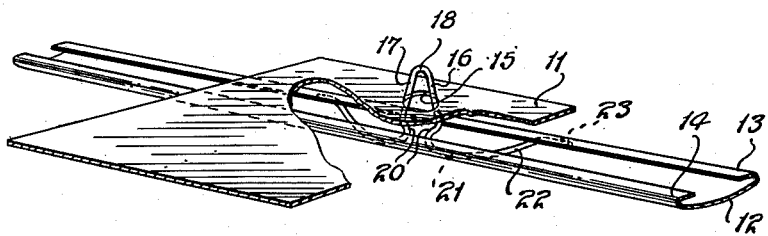
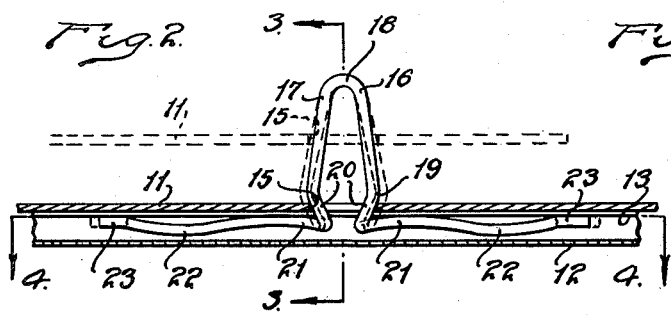 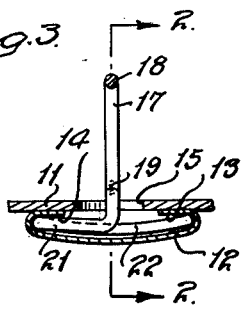
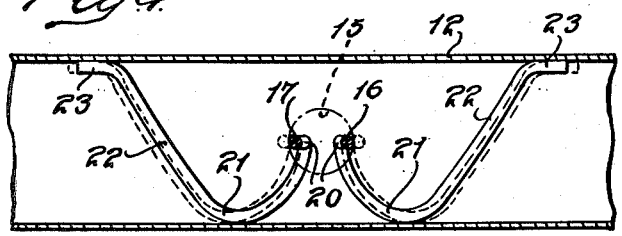
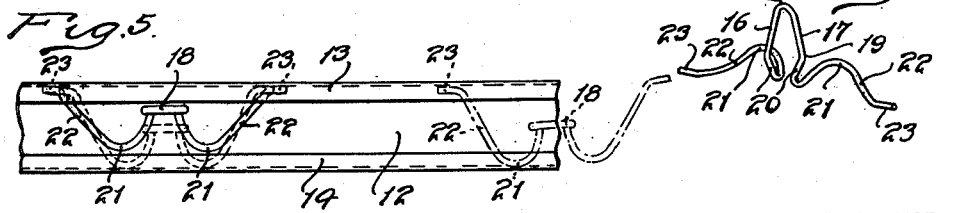 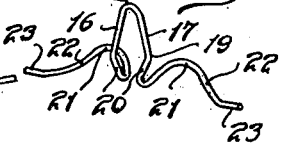
INVENTOR.
FRANK L. McLAUGHLIN.
BY Thos. Donnelly
ATTORNEY.

Patented July 16, 1940

2,208,008

UNITED STATES PATENT OFFICE 2,208,008

SNAP FASTENER

Frank L. McLaughlin, Detroit, Mich.

Application January 10, 1938, Serial No. 184,147

5 Claims. (Cl. 24—215)

My invention relates to a new and useful improvement in a snap fastener adapted for use particularly in securing trim molding and the like to a supporting body.

It is an object of the present invention to provide a snap fastener of this class made from resilient material such as wire or the like and so constructed and arranged that it may be slipped into a channel-shaped strip of trim molding from the ends thereof or snapped into position over the inturned flanges.

It is another object of the present invention to provide a snap fastener of this class which may be easily and quickly mounted in position on a channel bearing member having inwardly directed flanges to provide a securing prong projecting outwardly from the channel bearing member to form at the proper locations a securing device.

It is another object of the present invention to provide a snap fastener of this class so arranged and constructed that when mounted in position on a trim molding having inwardly directed flanges, it will serve to retain a fastening prong projecting outwardly from the trim molding and prevent longitudinal movement of the fastening prong while at the same time resisting movement of the fastening prong transversely of the molding strip.

It is another object of the invention to provide a snap fastener of this class which will be simple in structure, economical of manufacture, durable, and highly efficient in use.

Other objects will appear hereinafter.

The invention consists in the combination and arrangement of parts hereinafter described and claimed.

The invention will be best understood by a reference to the accompanying drawing which forms a part of this specification, and in which, Fig. 1 is a perspective view of a structure with parts broken away and parts shown in section illustrating the invention applied, Fig. 2 is a longitudinal, sectional view of a strip of molding showing the invention applied thereto and illustrated in side elevation, Fig. 3 is a sectional view taken on line 3—3 of Fig. 2, Fig. 4 is a sectional view taken on line 4—4 of Fig. 2, Fig. 5 is a top plan view showing the application of the invention to a molding strip, and Fig. 6 is a perspective view of the invention.

The invention is especially adapted for use in securing to a supporting body 11 a molding strip 12 having the inturned edge flanges 13 and 14. The supporting body 11 is provided at spaced locations with openings 15. The fastener as illustrated, is made from a single piece of resilient material such as wire or the like and is doubled upon itself at its medial line to provide a fastening prong which is insertible through an opening 15 in the supporting body 11. The opposite sides 16 and 17 of this fastening prong diverge from the outer end 18 which is curved and this divergence continues to the point 19. Proceeding from this point 19, these sides are bent inwardly toward each other sharply to provide the converging portions 20. As the prong is projected through the opening 15, the sides 16 and 17 will be flexed inwardly toward each other against the resiliency of the material from which made. This flexing is indicated in Fig. 4 and Fig. 2, the sides being shown flexed in full lines inwardly toward each other from the original position indicated in dotted lines. When the prong is fully thrust through the opening 15, the supporting body 11 will be engaged by the converging portions 20 which serve as a yieldable lock for resisting withdrawal of the prong from the opening 15. On account of the sharp incline of these portions 20, the resiliency of the snap fastener tends to move the body 11 farther toward the base of the prong.

The wire from which each of the sides is made extends from the end or the base of the portion 20 in a curve outwardly from the face of the plane determined by the sides 16 and 17 to provide the curved or arcuate portion 21 which extends into a portion 22 terminating at its end in the angularly turned engagement portion 23. It will be noted that the portion 22 traverses the plane determined by the sides 16 and 17 so that the angularly turned portion 23 lies at the opposite side of this plane to the side on which the curved portion 21 lies. The portion 22 from the top is straight as clearly appears in Fig. 4. This portion, however, is curved downwardly to provide the arcuate formation clearly illustrated in Fig. 2 so that the curved inner face of the molding strip 12 will lie in engagement with the portion 22 throughout its length. It is also to be noted that the plane in which the curved portion 21 lies is not at right angles to the plane determined by the sides 16 and 17 but tilts upwardly thereto. It is to be noted that the sides are each formed into a bow-shaped structure which extends away from the opposite side as clearly shown in Fig. 4. When inserted in the channel each bow is anchored at one end by the side from which it proceeds and engages at its back one side of the strip or body 12 and at its free end the opposite side of the strip or body 12. The flexing and the strain, therefore, is all effected in these bow-shaped structures and, by turning the ends of the body 12 inwardly to provide the inturned flanges 13 and 14, there is formed an abutment against which the back of the bow-shaped structure engages and against which the outer end of the bow engages. The structure is held in position on the body 12 through the functioning of the bow-shaped structure and this engaging contact is not dependent upon the separating or closing of the sides of the prong. The distortion is in the bow-shaped structures and each of these structures is distorted from its normal position when mounted in position on the body 12.

In assembling the fastener on the channel-shaped strip, the fastener may be slid inwardly from the end of this channel strip as illustrated at the right of the drawing in Fig. 5. These snap fasteners will, of course, be made of a size to correspond to the size of the strip of molding with which used and when inserted into the strip of molding, the engagement portion 23 will be in engagement with the molding strip at the base of the channel on one side of the strip and the periphery of the curved portion 21 will be in engagement with the base of the channel at the opposite side of the strip. The entire structure will be under tension and the portions 22 which may be termed the legs, will be flexed outwardly tending to slightly straighten the curved portions 21. The curved portion 21 will also be flexed against its tilt so that the entire part of the curved portion will lie in engagement with the base of the molding strip. This assures the projection of the fastening prong outwardly perpendicularly to the plane determined by the inwardly turned flanges 13 and 14 which align with each other, while at the same time lateral movement of the prong relatively to the strip of molding is prevented as is likewise any axial movement of the prong relatively to the molding strip.

It is not always convenient to insert the snap fastener from the end of the molding strip and in some cases this would consume considerable time. The present snap fastener may be snapped into position at any desired point on the strip and this movement is illustrated in Fig. 5 to the left of the drawing. In fastening the snap fastener on the strip in this manner, the engagement portions 23 would be inserted beneath one of the flanges of the molding strip. By pressing transversely of the molding strip on the fastening prong, the legs 22 would be flexed so as to spread farther outwardly to permit the curved portion 21 to snap in under the oppositely positioned channel, whereupon the legs 21 would partially return to their normal position in response to the resiliency of the material from which made as is illustrated by dotted lines in Fig. 5. Thus, it becomes a simple operation to snap the fastener into position at any desired location on the strip, thus obviating the necessity of inserting the fastener into the strip from its end and sliding it along the strip to the desired location.

It is believed obvious that when the fastener is mounted in position outward axial pull on the fastening prong would not dislodge the fastener from its connections on the molding strip. Consequently, there is thus provided a simple and effective means for securely fastening a molding strip on a supporting structure having openings formed therein through which the fastening prongs may be projected.

While I have illustrated and described the preferred form of construction, I do not wish to limit myself to the precise details of structure shown, but desire to avail myself of such variations and modifications as may come within the scope of the appended claims.

What I claim as new is:

1. In a snap fastener adapted to secure a member to a support, said member including oppositely disposed abutment portions and engageable by portions of said fastener to retain the latter therein; said fastener comprising a prong embodying a pair of spaced, resilient side members lying in the same plane throughout their length longitudinally of said abutment portions and extending from said member at substantially right angles thereto and intermediate said abutment portions, each of said side members having an integral and substantially bow-shaped extension on one end thereof, said extensions each including an apex and a free end, said apexes bearing against one abutment portion and said free ends bearing against the opposite abutment portion, said extensions both lying substantially in a plane at right angles to the plane of said side members, said apex and free end of each extension being offset relative to their side members and to each other, and in each extension the free end is positioned at a greater distance from its side member than is the apex of the extension.

2. The structure of claim 1, and said apexes and free ends of said extensions being each substantially equi-distant from said plane of said side members.

3. The structure of claim 1, the free ends of said extensions being provided with offset tip portions arranged in substantial axial alignment with each other and engaging one of said abutment portions of said members.

4. The structure of claim 1, the free ends of said extensions being provided with offset tip portions arranged in substantial axial alignment with each other and engaging one of said abutment portions of said member, and said apexes and free ends of said extensions being substantially equi-distant from said plane of said side members.

5. The structure of claim 1, the free ends of said extensions being spaced apart a distance at least as great as twice the distance separating said abutments.

FRANK L. McLAUGHLIN.